United States Patent [19]

So

[11] Patent Number: 5,235,023
[45] Date of Patent: Aug. 10, 1993

[54] PROCESS FOR SYNTHESIS OF HETEROCYCLIC POLYMERS WITH TRIHALOMETHYL AZOLE-FORMING SITE

[75] Inventor: Ying H. So, Midland, Mich.

[73] Assignee: The Dow Chemical Company, Midland, Mich.

[21] Appl. No.: 690,910

[22] PCT Filed: Dec. 22, 1988

[86] PCT No.: PCT/US88/04629
§ 371 Date: Jun. 6, 1991
§ 102(e) Date: Jun. 6, 1991

[87] PCT Pub. No.: WO90/06960
PCT Pub. Date: Jun. 28, 1990

[51] Int. Cl.$^5$ .................... C08G 73/00; C08G 75/32
[52] U.S. Cl. ........................ 528/179; 528/86; 528/183; 528/186; 528/210; 528/336; 528/337; 528/342; 528/397; 528/422

[58] Field of Search ............... 528/179, 210, 183, 186, 528/336, 337, 342, 397, 422, 86

[56] References Cited

U.S. PATENT DOCUMENTS

| | | | |
|---|---|---|---|
| 4,225,700 | 9/1980 | Wolf et al. | 528/179 |
| 4,312,976 | 1/1982 | Choe | 528/179 |
| 4,423,202 | 12/1983 | Choe | 528/179 |
| 4,608,427 | 8/1986 | Sweeny et al. | 528/179 |

Primary Examiner—Harold D. Anderson

[57] ABSTRACT

In reactions to form PBZ polymers such as polybenzoxazole, monomers having an aromatic group bonded to a primary amine group and to a hydroxy, thio or amine group ortho to said primary amine group are contacted with monomers having an "electron-deficient carbon group." In the present invention the electron-deficient carbon group may be an alkali metal carboxylate group or a trihalomethyl group. Useful monomers include, for example, $\alpha,\alpha,\alpha,\alpha',\alpha',\alpha'$,-hexachloroxylene and disodium terephthalate.

10 Claims, No Drawings

PROCESS FOR SYNTHESIS OF HETEROCYCLIC POLYMERS WITH TRIHALOMETHYL AZOLE-FORMING SITE

FIELD OF THE ART

The invention relates to the synthesis of polybenzoxazole, polybenzimidazole and polybenzothiazole polymers.

BACKGROUND OF THE INVENTION

Polybenzoxazole (PBO), polybenzimidazole (PBI) and polybenzothiazole (PBT) and related polymers (hereinafter referred to as PBZ polymers) are known polymers which can be extruded as fibers or films having a high tensile strength and high tensile modulus which are useful for structural applications. It is known in the art to synthesize PBZ polymers by the reaction of a first monomer having a primary amine group and a hydroxy, thio or amine group bonded to an aromatic group in ortho position with respect to each other, and a second monomer having an "electron-deficient carbon group". Known electron-deficient carbon groups are set out in Table I hereinafter.

TABLE I

| —COOH | —CSSH | —COBR | —CSI |
|---|---|---|---|
| —CSOH | —COCO | —CSBR | CONHR$_1$ |
| —COSH | —CSCO | —COI | —CS |
| | | | —CN |

See, e.g., Wolfe et al, *Liquid Crystalline Polymer Compositions and Process and Products*, U.S. Pat. No. 4,703,103 (Oct. 27, 1987); Tsai et al., *Method for Making Heterocyclic Block Copolymer*, U.S. Pat. No. 4,578,432 (Mar. 25, 1986); Wolfe et al., *Liquid Crystalline Poly(2,6-Benzothiazole) Compositions, Process and Products*, U.S. Pat. No. 4,644,724 (Aug. 6, 1985); Wolfe, *Liquid Crystalline Polymer Compositions, Process and Products*, U.S. Pat. No. 4,533,693 (Aug. 6, 1985) and Wolfe et al., *Liquid Crystalline Polymer Compositions and Process and Products*, U.S. Pat. No. 4,533,692 (Aug. 6, 1985), which are incorporated herein by reference.

In most commonly used monomers, the electron-deficient carbon group is either a carboxylic acid group or a carboxylic acid halide group. For instance, monomers may be 4-hydroxy-5-aminobenzoic acid, terephthalic acid, or terephthaloyl chloride.

Several problems are associated with the known monomers. Acids such as terephthalic acid are highly insoluble in solvents which will dissolve the polymer, so that they must be micronized to produce PBZ polymers of high molecular weight. Acid chlorides such as terephthaloyl chloride are moisture sensitive and can sublime easily. What is needed is a process to synthesize PBZ polymers using monomers having electron-deficient carbon groups which are not moisture sensitive and do not require physical micronization prior to their use in the reaction.

SUMMARY OF THE INVENTION

The present invention is a process for synthesizing PBZ polymers comprising the step of contacting:

(1) a first monomer having
  (a) a first aromatic group;
  (b) a first o-amino-basic moiety bonded to said first aromatic group, which o-amino-basic moiety contains both:
    (i) a first primary amine group and
    (ii) a hydroxy group, a thio group, or a primary or secondary amine group ortho to said first primary amine group; and
  (c) an azole-forming site bonded to said first aromatic group which is either:
    (i) a second o-amino-basic moiety; or
    (ii) an electron-deficient carbon group which is either a trihalomethyl group or an alkali metal carboxylate group, and (2) a second monomer having:
  (a) a divalent organic moiety which is inert with respect to all reagents under reaction conditions;
  (b) a first electron-deficient carbon group which is either a trihalomethyl group or an alkali metal carboxylate group bonded to said divalent organic moiety; and
  (c) an azole-forming site bonded to said divalent organic moiety which is either:
    (i) a second electron-deficient carbon group having the same description as the first electron-deficient carbon group; or
    (ii) an o-amino-basic moiety, only if the divalent organic moiety comprises an aromatic group, in a mineral acid under conditions such that a PBZ polymer is formed. Other aspects of the present invention are: 1) a polymer dope made by the present process comprising a PBZ polymer and a mineral acid; 2) a PBZ polymer made by the present process; and 3) a shaped article, such as a fiber or a film, comprising a PBZ polymer made by the present process.

The process of the present invention forms PBZ polymers similar to those already known and described in the literature. However, monomers containing electron-deficient carbon groups used in the present invention need not be micronized and are not sensitive to the presence of moisture. Further advantages to the present invention are set out hereinafter.

DETAILED DESCRIPTION OF THE INVENTION

Definitions

The following terms, which are used repeatedly throughout this application, have the meanings and preferred embodiments set out hereinafter unless otherwise specified.

Aromatic group (ar)—any aromatic ring or ring system. Size is not critical as long as the aromatic group is not so big that it prevents further reactions of the moiety in which it is incorporated. Aromatic groups preferably comprise no more than about 18 carbon atoms, more preferably no more than about 12 carbon atoms and most preferably no more than about 6 carbon atoms, not including any organic substituent on the aromatic group. They may be heterocyclic but are preferably carbocyclic and more preferably hydrocarbyl. If they are heterocyclic, they are preferably nitrogen-containing heterocycles. They may comprise a single aromatic ring, a fused ring system or an unfused ring system. Aromatic groups preferably comprise a single ring.

Aromatic groups may contain substituents which are stable in mineral acid, such as halogens, phenyl sulfone moieties, alkoxy moieties, aryloxy moieties or alkyl groups, but they preferably have no substituents other than those specified hereinafter. If they contain alkyl substituents, those substituents preferably comprise no more than about 6 carbon atoms.

Azole ring—an oxazole, thiazole or imidazole ring. The carbon atoms bonded to both the nitrogen atom and the oxygen, sulfur or second nitrogen atom is the 2-carbon, as depicted in formula 1

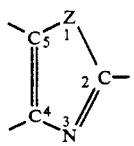

wherein Z is —O—, —S— or —NR—; and R is hydrogen, an aromatic or an aliphatic group, preferably hydrogen or an alkyl group, and most preferably hydrogen, R preferably comprises no more than about 6 carbon atoms, more preferably no more than about 4 and most preferably no more than about 1. Each azole ring is independently preferably oxazole or thiazole and more preferably oxazole. In PBZ polymers, the 4 and 5 carbon atoms are ordinarily fused with an aromatic group.

Azole-forming moiety—an "o-amino-basic moiety" or "electron-deficient carbon group," as those terms are hereinafter defined.

o-Amino-basic moiety—a moiety bonded to an aromatic group, which o-amino-basic moiety contains
(1) a first primary amine group bonded to the aromatic group and
(2) a hydroxy, thiol or primary or secondary amine group bonded to the aromatic group ortho to said primary amine group. It preferably comprises a hydroxy, thiol or primary amine moiety, more preferably comprises a hydroxy or thio moiety, and most preferably comprise a hydroxy moiety. If the o-amino-basic moiety comprises two amine groups, preferably both are primary amine groups. If the o-amine-basic moiety contains a secondary amine group, the secondary amine group may comprise an aromatic or an aliphatic group but preferably comprises an alkyl group. The secondary amine group preferably comprises no more than about 6 carbon atoms, more preferably no more than about 4 carbon atoms and most preferably no more than about 1 carbon atom.

Electron-deficient carbon group (Q)—any group containing a carbon atom which can react in the mineral acid with an o-amino-basic moiety to form an azole ring, such as the groups listed in column 24, lines 59-66 of the U.S. Pat. No. 4,533,693, which is incorporated herein by reference. Preferred electron-deficient carbon groups are carboxylic acids, acid halides, metal carboxylate salts, cyano groups and trihalomethyl groups. Halogens in electron-deficient carbon groups are preferably chlorine, bromine or fluorine and are more preferably chlorine.

Mineral acid—any liquid acid capable of dissolving PBZ polymers, such as sulfuric acid, methanesulfonic acid, polyphosphoric acid and mixtures thereof. Mineral acids are preferably polyphosphoric acid or a mixture of methanesulfonic acid and phosphorus pentoxide. Polyphosphoric acid preferably has a $P_2O_5$ content by weight of at least about 70 percent, more preferably at least about 75 percent and preferably has a $P_2O_5$ content of at most about 90 percent, more preferably at most about 85 percent. The ratio of methanesulfonic acid to phosphorus pentoxide in mixtures of those compounds is preferably no more than about 20:1 by weight and no less than about 5:1 by weight.

PBZ polymer—A polymer from the group of polybenzoxazoles and polybenzobisoxazoles (PBO), polybenzothiazoles and polybenzobisthiazoles (PBT) and polybenzimidazoles or polybenzobisimidazoles (PBI). For the purposes of this application, the term "polybenzoxazole (PBO)" refers broadly to polymers in which each unit contains an oxazole ring bonded to an aromatic group, which need not necessarily be a benzene ring. The term "polybenzoxazole (PBO)" also refers broadly to poly(phenylene-benzo-bis-oxazole)s and other polymers wherein each unit comprises a plurality of oxazole rings fused to an aromatic group. The same understandings shall apply to the terms polybenzothiazole (PBT) and polybenzimidazole (PBI). As used in this application, the term also encompasses mixtures, copolymers and block copolymers of two or more PBZ polymers, such as mixtures of PBO, PBT and/or PBI and block or random copolymers of PBO, PBI and PBT.

Rigid Rod PBZ polymer—An "intrinsic" or "articulated" rigid rod PBZ polymer as the terms "intrinsic" and "articulated" are defined in Hwang, "Processing, Structure and Properties of Liquid Crystalline PBT Polymer", Kansai Committee of the Society of Fiber Science and Technology, Japan, Post Symposium on Formation, Structure and Properties of High Modulus and High Tenacity Fibers 23-26 (Aug. 26, 1985); Evers et al, "Articulated All-Para Polymers with 2,6-Benzobisoxazole, 2,6-Benzobisthiazole, and 2,6-Benzobisimidazole Units in the Backbone," 14 Macromolecules 925 (1981); Evers, "Thermooxidatively Stable Articulated Benzobisoxazole and Benzobisthiazole Polymers," 24 J. Poly Sci. Part A 1863 (1986) and Evers et al., *Articulated Para-Ordered Aromatic Heterocyclic Polymers Containing Diphenoxybenzene Structures*, U.S. Pat. No. 4,229,566 (Oct. 21, 1980).

Intrinsic rigid rod polymers are essentially rectilinear and have a persistence length comparable to their contour length. Articulated rigid rod polymers comprise a plurality of essentially rectilinear moieties joined by a relatively small number of non-linear moieties. Rigid rod PBZ polymers used in the present invention are preferably intrinsic rigid rod polymers. If articulated, they preferably comprise on average no more than about 1 non-linear mer unit for each 9 essentially rectilinear mer units.

PROCESS OF THE PRESENT INVENTION

The present invention uses novel monomers in connection with known monomers to form known PBZ polymers. As with previously known processes, the present invention can be practiced by the self-polymerization of a self-polymerizing monomer having an o-amino-basic moiety and an electron-deficient carbon group, or by the copolymerization of a first monomer having two o-amino-basic moieties with a second monomer having two electron-deficient carbon groups. However, in the instant process, the electron-deficient carbon groups, which are represented in U.S. Pat. No. 4,533,693 and 4,772,678 by the characters $Z_1$ and $Z_2$, are independently trihalomethyl groups or alkali metal carboxylate groups. Halogens in the trihalomethyl group are preferably either fluorine, chlorine or bromine and are more preferably chlorine. Metals in the alkali metal carboxylate groups are preferably lithium, sodium or potassium and more preferably lithium or sodium.

Self-polymerizing monomers comprise an aromatic group bonded to an o-amino-basic group, as that term is previously defined, and an electron-deficient group. The aromatic group has the limitations and preferred embodiments previously described. Self-polymerizing monomers may be, for example, 4-trichloromethyl-2-aminophenol, 5-trichloromethyl-2-aminophenol, sodium 4-hydroxy-3-aminobenzoate or sodium 3-hydroxy-4-aminobenzoate.

Self-polymerizing monomers comprising trihalomethyl groups can be synthesized by known reactions from aromatic compounds containing a methyl substituent and a hydroxyl substituent. First, the aromatic compound is nitrated to provide a nitro group ortho to the hydroxyl group. Preferably, the methyl group is para to the hydroxyl group, since that configuration minimizes undesirable isomers. Second, after separating undesirable isomers, the nitrate group is hydrogenated, for instance with palladium on carbon. The nitration and hydrogenation conditions may be similar to those described in Lysenko, *High Purity Process for the Preparation of 4,6-Diamino-1,3-benzenediol*, U.S. Pat. No. 4,766,244 (Aug. 23, 1988), which is incorporated herein by reference. Third, the methyl group is halogenated by known methods such as exposure to molecular halogen and light; for instance as described in R. T. Morrison et al., *Organic Chemistry* 386–87, 584–85 (3rd Ed. 1973).

Self-polymerizing monomers containing metal carboxylate groups are synthesized from ordinary self-polymerizing monomers, which contain acid groups, by reaction with an alkali metal base, such as sodium hydroxide. The synthesis of monomers containing acid groups is taught in U.S. Pat. No. 4,533,693, columns 33—35 and references named therein, which are incorporated herein by reference, and in related U.S. patents set out previously.

Copolymerization utilizes first copolymerizing monomers comprising an aromatic group and two o-amino-basic moieties. Such monomers are well-known in the art. They are described as Type I monomers in U.S. Pat. No. 4,533,693, columns 17–24. The aromatic group and o-amino-basic moieties have the same limitations and preferred embodiments previously given. Of course, a mixture of those monomers may be used to provide a random copolymer. The most preferred first copolymerizing monomers and processes for making them are described in Lysenko, *High Purity Process for the Preparation of 4,6-Diamino-1,3-benzenediol*, U.S. Pat. No. 4,766,244 (Aug. 23, 1988) and in U.S. Pat. No. 4,533,693 in Table I, columns 19–21, which are incorporated herein by reference.

The first copolymerizing monomers react with second copolymerizing monomers which comprise two electron-deficient carbon groups linked by a divalent organic moiety which is inert with respect to all reagents under reaction conditions.

The divalent organic moiety preferably comprises no more than about 18 carbons, more preferably no more than about 12 carbons and most preferably no more than about 6 carbons. It may be aliphatic, but is preferably aromatic and is more preferably a carbocyclic aromatic group. If aliphatic, it is preferably an alkyl group. If aromatic, it is preferably a single ring or two unfused rings joined by a single bond. Examples of organic moieties suitable for the second copolymerizing monomers are found in U.S. Pat. No. 4,533,693 from column 12, line 10 to column 13, line 30 and from column 14, line 60 to column 16, line 40.

Electron-deficient carbon groups are preferably bonded to the divalent organic moiety in para position with respect to each other. If the divalent organic moiety comprises two unfused rings, one electron-deficient carbon group is preferably bonded to each ring para to the other ring. Second copolymerizing monomers may be, for example $\alpha,\alpha,\alpha,\alpha',\alpha',\alpha'$-hexachloro-p-xylene, dilithium terephthalate or disodium isophthalate.

Copolymerizing monomers containing two trihalomethyl groups can be synthesized by a series of known reactions. Aromatic compounds having two pendant methyl groups, such as xylenes, are commercially available or can be synthesized as a mixture of isomers by known processes such as Friedel-Crafts alkylation, for instance as described in Morrison et al., *Organic Chemistry* 377–382, which is incorporated herein by reference. The monomer is then synthesized by halogenation of the pendant methyl groups as previously described.

Copolymerizing monomers containing two alkali metal carboxylate groups can be synthesized by contacting a monomer having two acid groups with a alkali metal base such as sodium or lithium hydroxide. Many diacid monomers such as terephthalic acid, isophthalic acid and the aliphatic diacids are commercially available. Those diacid monomers and others can also be synthesized by known methods, such as descried in U.S. Pat. No. 4,533,693 at col. 25–32 and the references cited therein, which are incorporated herein by reference.

The monomers react under conditions already known for the synthesis of PBZ polymers, such as those described in U.S. Pat. No. 4,533,693 at column 42, line 61 to column 45, line 62 and in U.S. Pat. No. 4,772,678 at col. 39 line 55 to col. 48 line 56, which are incorporated herein by reference.

The reaction takes place in a mineral acid, as that term is previously defined, which can dissolve or maintain in suspension the reagents and the polymer. When the electron-deficient carbon group is a trihalomethyl group, the mineral acid preferably comprises at least some methanesulfonic acid, since polyphosphoric acid alone provides only low molecular weight polymer. It more preferably is a mixture comprising both methanesulfonic acid and polyphosphoric acid. In such mixtures, the methanesulfonic acid preferably makes up no more than about 50 percent of the mixture by weight, more preferably no more than about 45 percent of the mixture by weight; and preferably makes up no less than about 20 percent of the mixture by weight, more preferably no less than about 40 percent.

When the electron-deficient carbon group is an alkali metal carboxylate, the mineral acid is most preferably polyphosphoric acid. When the mineral acid is polyphosphoric acid, the phosphorous pentoxide content of the polyphosphoric acid is preferably controlled as described in U.S. Pat. 4,533,693 from column 42, line 61 to column 43, line 18. The initial phosphorous content is preferably between about 63 percent and about 83.3 and the final phosphorous pentoxide content is preferably between about 82 percent and about 86 percent.

The reaction preferably takes place under a vacuum or under an inert atmosphere, for instance, a nitrogen atmosphere, helium atmosphere or argon atmosphere.

The temperature of the reaction is not critical as long as the reaction proceeds and the reagents and solvent are stable. The reaction temperature preferably does not reach 250° C., more preferably does not reach 220° C.

and most preferably does not reach 210° C. The reaction proceeds only very slowly at low temperatures. The reaction temperature is preferably always greater than 0° C. The maximum temperature of the reaction preferably reaches at least about 50° C., more preferably at least about 90° C., more highly preferably at least about 150° C. and most preferably at least about 190° C. Because starting reagents may sublime at higher temperatures, the reaction is most preferably begun at a lower starting temperature such as about 50° C. and the temperature is most preferably raised to a higher temperature such as about 190° C. later.

The polymers produced by this process comprise repeating units identical to the repeating mer units produced by known methods for synthesizing PBZ polymers. Such polymers are illustrated in U.S. Pat. No. 4,533,693 and particularly at column 10, lines 1–35, which are incorporated herein by reference. The azole rings on the polymer are preferably oxazole rings. Each repeating polymer unit preferably complies with Formula I in column 10, lines 5–20 of U.S. Pat. No. 4,533,693. The polymers produced are preferably rigid rod PBZ polymers produced from copolymerizing monomers.

Monomers used in the present process have distinct advantages over previously known monomers. Monomers containing carboxylic acid, such as terephthalic acid, are highly insoluble and must be micronized to provide polymer of good molecular weight. The molecular weight is measured by intrinsic viscosity in methanesulfonic acid. Terephthalic acid must be micronized to particles having an average diameter of 2 to 10 microns. Otherwise, the intrinsic viscosity of the resulting polymer is substantially less than 10. Acid halides need not be micronized but are extremely moisture sensitive. If they are contacted with water, they react to form acids which must be micronized.

Monomers containing trihalomethyl groups are not moisture sensitive and need not be sealed from atmospheric moisture prior to use. Furthermore, they do not need not be micronized and can be used in particles having an average size grater than 10 microns. Polymer made from particles averaging at least about 50 microns or even about 100 microns in size can have viscosities of at least about 10 dL/g, more preferably at least about 20 dL/g and most preferably at least about 32 dL/g.

Furthermore, the reaction of monomer containing trihalomethyl groups does not generate water, which lowers the $P_2O_5$ concentration of the polyphosphoric acid in which the reaction occurs, as other monomers do. Therefore, the need to adjust the $P_2O_5$ content of the polyphosphoric acid may be lessened or eliminated, depending upon the initial $P_2O_5$ content of the acid. Finally, the trihalomethyl group is a common intermediate group for making acids or acid chlorides, so that reacting it as is eliminates the need for a process step to convert it to an acid group. See, e.g., R. T. Morrison et al., *Organic Chemistry* 585 (3rd Ed., 1973).

Monomers having alkali metal carboxylate groups can also be used in particles with an average size greater than about 10 microns. Particles having an average size of greater than 10 microns but no more than about 38 microns can provide polymer with an intrinsic viscosity of at least about 15 dL/g and preferably at least about 20 dL/g. If the monomer is sifted to eliminate particles with a diameter substantially above 38 microns, polymers with an intrinsic viscosity of at least about 25 dL/g can be produced. Furthermore, alkali metal salts do not sublime easily, so the need to keep the temperature low early in the reaction is reduced.

Most importantly, known reagents generate substantial amounts of hydrogen chloride gas during the reaction. In the thick dopes produced during the synthesis of PBZ, that gas causes foaming, which seriously complicates the synthesis of high molecular weight polymer. Surprisingly, reactions using monomers containing alkali metal salts exhibit significantly less foaming than reactions using known diacid reagents. Preferably, no substantially foaming is observed at all.

The polymer dope produced by the process of the present invention can be spun to form useful fibers or extruded to form useful films as described in U.S. Pat. No. 4,533,694, columns 82–84 or in Chenevey et al., *Process for Preparing Shaped Articles of Rigid Rod Heretocyclic Liquid Crystalline Polymers*, U.S. Pat. No. 4,606,875 (Aug, 19, 1986) which are incorporated herein by reference. The fibers and films have high tensile strength and modulus and a high resistance to organic solvents and to thermal degradation.

ILLUSTRATIVE EMBODIMENTS

The following examples are for illustrative purposes only and are not intended to limit the scope of either the specification or the claims. Unless stated otherwise, all parts and percentages are given by weight.

EXAMPLE 1

Synthesis of Poly(phenylenebenzo-bis-oxazole) Using $\alpha,\alpha,\alpha,\alpha',\alpha',\alpha'$,-Hexachloro-p-xylene $\alpha,\alpha,\alpha,\alpha',\alpha',\alpha'$,-Hexachloro-p-xylene is reduced to a powder having an average particle size of at least 50 to 100 microns by striking it with a hammer in a cloth. 4,6-Diaminoresorcinol di(hydrogen chloride) (4.70 g, 2.1 mmoles) and the hexachloroxylene (6.91 g, 22.1 mmoles) are mixed nitrogen atmosphere with 23.5 g of polyphosphoric acid having a $P_2O_5$ content of 65 percent. The temperature is raised to 90° C. for 16 hours. Sublimed hexachloroxylene is heater to melt and falls back into the pot. After 16 hours, 12.4 g of phosphorous pentoxide is added and substantial foaming is observed. Heating is continued at 90° C. for 24 hours. Phosphorous pentoxide (14 g) is added and heating is continued at 155° C. for 16 hours and 190° C. for 20 hours. A small quantity of the title polymer is precipitated from a small quantity of dope and is washed form 24 hours with water. The polymer is dried in a vacuum oven at 100° C. for 24 hours. Its intrinsic viscosity in methanesulfonic acid at about 25° C. is 11.3 dL/g.

EXAMPLE 2

Synthesis of Poly(phenylenebenzo-bis-oxazole) Using $\alpha,\alpha,\alpha,\alpha',\alpha',\alpha'$,-Hexachloro-p-xylene $\alpha,\alpha,\alpha,\alpha',\alpha',\alpha'$,-Hexachloro-p-xylene is reduced to a powder as described in Example 1. 4,6-Diaminoresorcinol di(hydrogen chloride) (4.69 g, 22.0 mmoles) and the hexachloroxylene (6.88 g, 22.0 mmoles) are mixed with 11.7 g of polyphosphoric acid having a $P_2O_5$ content of 72.5 percent and 11.0 g of methanesulfonic acid under nitrogen atmosphere. The temperature of the reaction is raised from 25° C. to 50° C. and maintained at 50° C. for 1½ hours. $P_2O_5$ (10.5 g) is added and some foaming is observed. 2.7 g of methanesulfonic acid are used to wash material off of the walls into the reaction mixture, and the temperature is increased to 70° C. for 17 hours and then to 145° C. for 48 hours. A small quantity of the title polymer is precipitated from a small quantity of dope and is washed for 24 hours with water. The polymer is dried in a vacuum oven at 120° C. for 24 hours. Its intrinsic viscosity in methanesulfonic acid at about 25° C. is 32 dL/g.

EXAMPLE 3

Synthesis of Poly(phenylenebenzo-bis-oxazole) Using α,α,α,α',α',α',-Hexachloro-p-xylene α,α,α,α',α',α',-Hexachloro-p-xylene is reduced to a powder as described in Example 1. 4,6-Diaminoresorcinol di(hydrogen chloride) (4.43 g, 20.8 mmoles) and the hexachloroxylene (6.50 g. 20.8 mmoles) are added to a mixture of 14.6 g of commercial polyphosphoric acid, 2 g of phosphorus pentoxide, 0.4 g distilled water and 14.6 g of methanesulfonic acid under nitrogen atmosphere. The temperature of the reaction is raised to 65° C. and maintained at 65° C. for 2 hours. The temperature is increased to 90° C. for 16 hours and then to 142° C. for 20 hours. Almost no foaming is observed. A small quantity of the title polymer is is extruded as a fiber from a small quantity of dope, but the fiber is very weak. 4 g of phosphorus pentoxide is added and the reaction is continued for 5 hours at 143° C. Fibers extruded from the dope after 2, 4 and 5 hours are progressively stronger. Without intending to be bound thereby, it is theorized that before the additional phosphorus pentoxide was added the weight ratio of methanesulfonic acid to polyphosphoric acid was too high. The intrinsic viscosity of the polymer in methanesulfonic acid is 21 dL/g.

EXAMPLE 4

Synthesis of Poly(phenylenebenzobisoxazole) Using α,α,α,α',α',α',-Hexachloro-p-xylene The process of Example 2 is repeated three times using the amounts of 4,6-diaminoresorcinol di(hydrogen chloride) (DAHB), hexachloroxylene (HEXA), polyphosphoric acid (PPA) and methanesulfonic acid (MSA) shown in Table II. The reaction proceeds for the number of hours shown in Table II at 145° C. Little or no foaming is observed throughout the reactions. The initial $P_2O_5$ content of the reaction is shown as in Table II and the final $P_2O_5$ content as shown in Table II is achieved by adding $P_2O_5$ during the reaction. The intrinsic viscosity ($\eta_{int}$) of each polymer is as shown in Table II. The Example in Run C demonstrates that fiber having a high intrinsic viscosity can be synthesized without the ordinary staging of phosphorus pentoxide addition.

TABLE II

| Run | DAHB (g) | HEXA (g) | PPA (g) | MSA (g) | hours at 145° C. | $P_2O_5$ Init. % | $P_2O_5$ Final % | $\eta_{int}$ |
|---|---|---|---|---|---|---|---|---|
| A | 4.55 | 6.68 | 14 | 11 | 12 | 77 | 84 | 22 |
| B | 4.40 | 6.46 | 19.2 | 4.0 | 24 | 77 | 84 | 19 |
| C | 4.45 | 6.54 | 21 | 14.6 | 6 | 87 | 87* | 15.5 |

*No $P_2O_5$ added during the reaction.

EXAMPLE 5

Synthesis of Polybenzoxazole Polymer from Dilithium Terephthalate

Dilithium terephthalate (4.20 g. 23.6 mmoles) is sieved through a 38-micron sieve. The dilithium terephthalate is mixed under nitrogen atmosphere with 5.02 g (23.6 mmoles) of 4,6-diaminoresorcinol di(hydrogen chloride) in 28.8 g of commercial grade polyphosphoric acid. The mixture is stirred and the temperature is raised from 25° C. to 95° C. over the space of about one hour. Phosphorous pentoxide (8.5 g) is added and the mixture is heated at about 100° C. for about 40 hours with stirring. With continued stirring, the temperature is raised to about 150° C. for about 2 hours and to about 190° C. for about 24 hours. Throughout the reaction essentially no foaming is observed. The title polymer is precipitated from a small quantity of dope with water and is washed for 48 hours. The polymer is dried in a vacuum oven at 100° C. for 24 hours. The polymer has an intrinsic viscosity in methanesulfonic acid of 22 dL/g.

EXAMPLE 6

Synthesis of Polybenzoxazole Polymer from Disodium Terephthalate

Disodium terephthalate (4.51 g, 21.5 mmoles) is sieved in a 38-micron sieve. The disodium terephthalate salt is mixed with 4.57 g (21.5 mmoles) of 4,6-diaminoresorcinol di(hydrogen chloride) in 28 g of commercial grade polyphosphoric acid with stirring. The temperature of the stirred mixture is raised from 25° C. to 95° C. over the space of about one hour and is left at 95° C. for 4 hours. Phosphorous pentoxide (8 g) is added and heating is continued for 20 hours at 95° C. The temperature is raised to 150° C. for 16 hours and then to 195° C. for 24 hours. Polymer is precipitated from a small quantity of dope with water and is washed for 48 hours. The polymer is dried in a vacuum oven at 100° C. for 24 hours. The polymer has an intrinsic viscosity in methanesulfonic acid of 18 dL/g. Essentially no foaming is observed during the reaction.

What is claimed is:

1. A process for synthesizing polybenzoxazole, polybenzothiazole or polybenzimidazole polymers comprising the step of contacting:
   (1) a first monomer having
      (a) a first aromatic group;
      (b) a first o-amino-basic moiety bonded to said first aromatic group, which o-amino-basic moiety contains both:
         (i) a first primary amine group and
         (ii) a hydroxy group, a thio group, or a primary or secondary amine group ortho to said first primary amine group; and
      (c) an azole-forming site bonded to said first aromatic group which is either:
         (i) a second o-amino-basic moiety; or
         (ii) an electron-deficient carbon group which is a trihalomethyl group, and
   (2) a second monomer having:
      (a) a divalent organic moiety which is inert with respect to all reagents under reaction conditions;
      (b) a first electron-deficient carbon group which is a trihalomethyl group bonded to said divalent organic moiety; and (c) an azole-forming site bonded to said divalent organic moiety which is either:
  (i) a second electron-deficient carbon group having the same description as the first electron-deficient carbon group; or
  (ii) optionally an o-amino-basic moiety, when the divalent organic moiety comprises an aromatic group, in a mineral acid under conditions such that a polybenzoxazole, polybenzothiazole or polybenzimidazole polymer is formed.

2. The process of claim 1 wherein:
said first aromatic group contains no more than about 18 carbon atoms;
said divalent organic moiety is either an aromatic group containing no more than about 18 carbon atoms or an alkyl group containing no more than about 12 carbon atoms;
all aromatic groups are either carbocyclic or nitrogen heterocycles;
the monomers are contacted under vacuum or inert atmosphere; and
the temperature of the process is between about 0° C. and about 250° C.

3. The process of claim 2 wherein each electron-deficient carbon group is a trihalomethyl group.

4. The process of claim 3 wherein each aromatic group comprises no more than about 12 carbon atoms, each o-amino-basic moiety comprises a hydroxy group or a thio group, and each halogen in each trihalomethyl group is chlorine or bromine.

5. The process of claim 4 wherein the mineral acid comprises methanesulfonic acid.

6. The process of claim 5 wherein each halogen in each trihalomethyl group is chlorine.

7. The process of claim 6 wherein:
the divalent organic moiety is an aromatic group;
the first monomer comprises two o-amino-basic moieties and the second monomer comprises two electron-deficient carbon groups;
each o-amino-basic moiety consists of a primary amine group and a hydroxy group; and
the maximum temperature during the process is between about 50° C. and about 210° C.

8. The process of claim 7 wherein the second monomer is $\alpha,\alpha,\alpha,\alpha',\alpha',\alpha'$,-hexachloroxylene having an average particle size greater than about 10 microns.

9. The process of claim 8 wherein the hexachloroxylene is reacted with 4,6-diaminoresorcinol.

10. In a process for synthesizing polybenzoxazole, polybenzothiazole or polybenzimidazole polymers wherein:
(1) a first monomer having
  a first aromatic group;
  a first o-amino-basic moiety bonded to said first aromatic group, which o-amino-basic moiety contains both:
    (i) a first primary amine group and
    (ii) a hydroxy group, a thio group, or a primary or secondary amine group ortho to said first primary amine group; and
  an azole-forming site bonded to said first aromatic group which is either:
    (i) a second o-amino-basic moiety; or
    (ii) an electron-deficient carbon group,
is contacted with
(2) a second monomer having:
  a divalent organic moiety which is inert with respect to all reagents under reaction conditions;
  a first electron-deficient carbon; and
  an azole-forming site bonded to said divalent organic moiety which is either:
    (i) a second electron-deficient carbon group; or
    (ii) an o-amino-basic moiety, when the divalent organic moiety comprises an aromatic group,
in a mineral acid under conditions such that a polybenzoxazole, polybenzothiazole or polybenzimidazole polymer is formed, the improvement wherein each electron-deficient carbon group is independently a trihalomethyl group.

* * * * *